Patented Jan. 5, 1937

2,066,365

UNITED STATES PATENT OFFICE 2,066,365

TRIDYMITE STONE

Hermann Salmang and Benno Wentz,
Aachen, Germany

No Drawing. Application November 20, 1930,
Serial No. 497,060. In Germany May 14, 1930

4 Claims. (Cl. 106—9)

The principal drawback of silica stones for furnace linings is their sensitivity to temperature variations below red heat. Above all, the transition from $\beta$-$\alpha$-quartz to $\alpha$-$\beta$-quartz at 575° C. and the transition from $\beta$-$\alpha$-cristobalite to $\alpha$-$\beta$-cristobalite at 200–230° C. are feared on account of the large change in volume. Efforts have been made for a long time to change quartz and cristobalite in silica stone into tridymite the transition of which at 117° C. involves a small variation in length. This conversion has, however, never been effected to a satisfactory extent. It is known that alkalies assist the conversion of quartz. It is also known that some other oxides can assist this conversion, but the stones made therewith had small strength and usually also a small tridymite content. The present process makes it possible to obtain stones of higher strength and tridymite content by this that a thin liquid melt which is formed within the material by an alkali oxide, calcium oxide, silica and another oxide such as iron oxide, magnesia, manganese oxide and the like carries the alkali for conversion to all parts of the surface of the quartz, even the most inaccessible. In addition to the formation of tridymite this melt helps to improve the resistance to compression of the stone. The inexpensive natron is preferably used as the alkali. The necessary chalk is present in the stone as the binding medium. The fourth flux medium may be magnesia, iron oxide, zinc oxide, nickel oxide and manganese oxide or the like, but not alumina, as this is found to hinder the conversion.

The novelty of this invention is that the presence of four of the oxides and about 20 hours firing with a pyrometer cone 15–16 suffices to transform all the quartz into tridymite.

*Example*

A raw silica mass, of which 50% is finely ground, is mixed with sulphite lye, 2% chalk, 1.5% natron and 1.5% iron oxide is dried, and burnt for 20 hours with a pyrometer cone 15 to 16.

What we claim is:—

1. A method of manufacturing tridymite stone consisting in burning for about 20 hours a silica mass of which part is finely ground mixed with sulphite of lye and the approximate proportions of 2% chalk, 1.5% natron and 1.5% iron oxide with pyrometer cone 15 to 16.

2. The method of converting a raw silica mass into tridymite which consists in firing a mixture including the raw silica mass, natron, chalk, and an oxide of a metal of the group consisting of: magnesium, iron, zinc, nickel and manganese.

3. The method of converting a raw silica mass into tridymite which consists in firing a mixture including chalk approximately 2%, an alkali carbonate approximately 1.5%, an oxide of a metal of the group consisting of magnesium, iron, zinc, nickel and manganese, approximately 1.5% and the balance the raw silica mass.

4. The method of converting a raw silica mass into tridymite which consists in heating to a temperature between 1435° C. and 1465° C. a mixture including chalk approximately 2%, natron approximately 1.5%, iron oxide 1.5% and the balance the raw silica mass.

HERMANN SALMANG.
BENNO WENTZ.